US010460601B2

(12) United States Patent
Publicover

(10) Patent No.: US 10,460,601 B2
(45) **Date of Patent: *Oct. 29, 2019**

(54) TRAFFIC MANAGEMENT DEVICE AND SYSTEM

(71) Applicant: Mark W. Publicover, Saratoga, CA (US)

(72) Inventor: Mark W. Publicover, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,027

(22) Filed: Nov. 6, 2017

(65) Prior Publication Data

US 2018/0061231 A1 Mar. 1, 2018

Related U.S. Application Data

(63) Continuation of application No. 14/878,918, filed on Oct. 8, 2015, now Pat. No. 9,812,009, which is a continuation of application No. 13/155,376, filed on Jun. 7, 2011, now Pat. No. 9,196,158, which is a continuation of application No. 12/974,598, filed on Dec. 21, 2010, now abandoned, which is a continuation of application No. 12/642,724, filed on Dec. 18, 2009, now abandoned, which is a continuation of application No. 11/861,158, filed on Sep. 25, 2007, now Pat. No. 7,663,505, which is a continuation-in-part of application No. 11/015,592, filed on Dec. 16, 2004, now Pat. No. 7,274,306.

(60) Provisional application No. 60/532,484, filed on Dec. 24, 2003.

(51) Int. Cl.

| | |
|---|---|
| *G06F 17/00* | (2019.01) |
| *G08G 1/095* | (2006.01) |
| *G08G 1/0967* | (2006.01) |
| *G08G 1/0962* | (2006.01) |
| *G08G 1/0965* | (2006.01) |
| *G08G 1/087* | (2006.01) |

(52) U.S. Cl.

CPC ............ *G08G 1/095* (2013.01); *G08G 1/087* (2013.01); *G08G 1/0962* (2013.01); *G08G 1/0965* (2013.01); *G08G 1/096716* (2013.01); *G08G 1/096725* (2013.01); *G08G 1/096758* (2013.01); *G08G 1/096775* (2013.01); *G08G 1/096791* (2013.01)

(58) Field of Classification Search

CPC .... G08G 1/087; G08G 1/0962; G08G 1/0965; G08G 1/096716; G08G 1/096725; G08G 1/096758; G08G 1/096775; G08G 1/096791

USPC ..................................... 340/932; 701/24, 96

See application file for complete search history.

(56) References Cited

U.S. PATENT DOCUMENTS

| | | |
|---|---|---|
| 3,509,525 A | 4/1970 | Levine et al. |
| 5,231,393 A | 7/1993 | Strickland |
| 5,926,113 A | 7/1999 | Jones et al. |

(Continued)

*Primary Examiner* — Brent Swarthout

(74) *Attorney, Agent, or Firm* — Klarquist Sparkman, LLP

(57) ABSTRACT

A smart traffic control device transmits information to approaching vehicles regarding its current and future state enabling vehicles to control their speed to avoid arriving at the traffic control device until it permits the passage of traffic, thus avoiding stopping, idling and reaccelerating when reaching the traffic control device. In other embodiments the traffic control device or systems receives information from vehicles, transmitting it to other vehicles.

13 Claims, 11 Drawing Sheets

(56) References Cited

U.S. PATENT DOCUMENTS

| | | | |
|---|---|---|---|
| 6,150,961 | A | 11/2000 | Alewine et al. |
| 6,204,778 | B1 | 3/2001 | Bergan et al. |
| 6,356,820 | B1 | 3/2002 | Hashimoto |
| 6,377,191 | B1 | 4/2002 | Takubo |
| 6,437,688 | B1 | 8/2002 | Kobayashi |
| 6,442,473 | B1 | 8/2002 | Berstis et al. |
| 6,463,900 | B1 | 10/2002 | Wakabayashi et al. |
| 6,516,273 | B1 | 2/2003 | Pierowicz et al. |
| 6,535,142 | B2 | 3/2003 | Wakabayashi et al. |
| 6,708,085 | B2 | 3/2004 | Yamane et al. |
| 6,728,623 | B2 | 4/2004 | Takenaga et al. |
| 6,765,495 | B1 | 7/2004 | Dunning et al. |
| 6,807,464 | B2 | 10/2004 | Yu et al. |
| 6,900,740 | B2 | 5/2005 | Bloomquist et al. |
| 6,958,707 | B1 | 10/2005 | Siegel |
| 6,965,829 | B2 | 11/2005 | Yamadaji et al. |
| 6,985,089 | B2 | 1/2006 | Liu et al. |
| 6,985,090 | B2 | 1/2006 | Ebner et al. |
| 6,985,827 | B2 | 1/2006 | Williams et al. |
| 6,989,766 | B2 | 1/2006 | Mese et al. |
| 6,999,001 | B2 | 2/2006 | Kojima |
| 7,050,903 | B1 | 5/2006 | Shutter et al. |
| 7,148,813 | B2 | 12/2006 | Bauer |
| 7,149,696 | B2 | 12/2006 | Shimizu et al. |
| 7,274,306 | B2 | 9/2007 | Publicover |
| 7,382,274 | B1 | 6/2008 | Kermani et al. |
| 7,383,121 | B2 | 6/2008 | Shinada |
| 7,663,505 | B2 * | 2/2010 | Publicover ............. G08G 1/095 340/932 |
| 7,711,485 | B2 * | 5/2010 | Matsumoto ................... 701/301 |
| 8,204,688 | B2 | 6/2012 | Cabral et al. |
| 9,196,158 | B2 | 11/2015 | Publicover |
| 9,812,009 | B2 | 11/2017 | Publicover |
| 2003/0063015 | A1 | 4/2003 | Ebner et al. |
| 2003/0191577 | A1 | 10/2003 | Decaux |
| 2006/0181433 | A1 | 8/2006 | Wolterman |
| 2011/0068950 | A1 | 3/2011 | Flaherty |
| 2014/0316865 | A1 * | 10/2014 | Okamoto ................. G08G 1/22 705/14.1 |
| 2016/0163200 | A1 * | 6/2016 | He ........................... G08G 1/22 701/117 |
| 2017/0293296 | A1 * | 10/2017 | Stenneth ............ G01C 21/3438 |

* cited by examiner

TRAFFIC MANAGEMENT DEVICE AND SYSTEM

CROSS REFERENCE TO RELATED APPLICATIONS

This is a continuation of application Ser. No. 14/878,918, filed Oct. 8, 2015, now U.S. Pat. No. 9,812,009, which is a continuation of application Ser. No. 13/155,376, filed Jun. 7, 2011, now U.S. Pat. No. 9,196,158, which is a continuation of application Ser. No. 12/974,598, filed Dec. 21, 2010, now abandoned, which is a continuation of application Ser. No. 12/642,724, filed Dec. 18, 2009, now abandoned, which is a continuation of application Ser. No. 11/861,158, filed Sep. 25, 2007, now U.S. Pat. No. 7,663,505, which is a continuation-in-part of application Ser. No. 11/015,592, filed Dec. 16, 2004, now U.S. Pat. No. 7,274,306, which claims the benefit of U.S. Provisional Application No. 60/532,484, filed Dec. 24, 2003, all of which applications and patents are incorporated herein by reference.

BACKGROUND AND SUMMARY

The present invention relates generally to the field of transportation, and more specifically to a process for improving the traffic flow on roads that utilize lights and signage to control the flow of vehicles through intersections. It can also improve traffic flow on highways and freeways where lights and signage are reduced or non-existent.

While traffic lights work effectively to allow for the safe passage of vehicles through intersections, they have limited capabilities to manage traffic flow in their current configuration. Some traffic lights operate in response to detecting the relative traffic volume in the cross streets they regulate, providing a greater interval of time for vehicles to pass in proportion to the higher traffic load in one direction, with a shorter travel interval to the opposing traffic. However, even when traffic lights are optimally efficient to manage a difference in traffic flow on second by second needs basis, vehicles are necessarily stopped in lines at the traffic light for some period of time, creating traffic congestion.

Increasing population density has generated growing traffic congestion problems that increase air pollution and fuel inefficiency.

It is therefore the primary object is to reduce traffic congestion.

The idea of controlling traffic on expressways by timing lights is well known in the art. Simple traffic light coordination schemes that have previously been implemented do not have the ability to actively manage the speed and routing of traffic to eliminate the waste of stopped vehicles and ensure peak flow rates. Accordingly, the inability to better coordinate individual vehicle speeds on roads with intersections is a major cause of traffic congestion, air pollution, and fuel inefficiency.

The system described herein can provide for more fuel-efficient transportation on roads utilizing traffic lights and signage at intersections.

The system described herein can provide for more fuel-efficient transportation on freeways and roads without traffic lights, especially during periods of heavy traffic.

The system described herein can increase transportation system capacity with minimum capital cost and taking of land for infrastructure.

The system described herein can improve safety by more effectively regulating and coordinating the flow of traffic through intersections and on freeways.

Typical freeway traffic consists of vehicles traveling at self managed speeds. When freeway traffic increases, vehicles tend to bunch up in continuous and relatively regular spacing and the rate of speed decreases. In these cases, driver error or lag from driver reaction time is compounded as each vehicle in makes speed changes in series. It is counter-intuitive to manage freeway traffic so that vehicles are grouped in pods with larger spacing in between. However, it will be shown that, in the system described herein, this traffic flow method can alleviate traffic congestion and improve overall traffic flow.

Other aspects will become apparent from the following descriptions, taken in connection with the accompanying drawings, wherein, by way of illustration and example, an embodiment is disclosed.

In accordance with one embodiment, there is disclosed a process for managing traffic on roads with and without intersections by enabling drivers and vehicle control systems to more effectively manage the speed of their vehicles to improve fuel efficiency and better coordinate traffic flow.

In one aspect, each vehicle is fitted with a device that times approaching traffic lights and relays information to the driver via a display that enables the driver to adjust the speed of the vehicle so that it reaches the intersection while the light is green. This knowledge helps the driver to manage vehicle speed so that he does not waste the time and energy to stop and wait for the light to change.

A secondary benefit is to help coordinate the speed of vehicles on freeways to maintain higher speeds during heavy traffic periods Other benefits will be realized with the creation of new traffic laws to more effectively manage driver behavior so as to take advantage of the technology described herein.

The above and other objects, effects, features, and advantages will become more apparent from the following description of the embodiments thereof taken in conjunction with the accompanying drawings.

DETAILED DESCRIPTION

A conventional traffic control device (TCD) such as alternating color lights, i.e. green (go), yellow (warning), red (stop), flashing lights or variable signage, and the like is optionally controlled by a master controller, timing circuit, a pedestrian cross-walk or emergency vehicles. Such TCD may also deploy variable timing cycles, that is the percentage or length of time one cross street receives a green light differs from the other cross street, in response to measured traffic volume or historical patterns. All these embodiments of TCD's are compatible with the instant system, characterized by a TCD that deploys a transmitting device to signal approaching traffic of its current state and the time remaining until the state changes, or optionally until it returns to the "green" state for on coming traffic. Accordingly, in another aspect the vehicle has a receiving device to collect signals from the TCD, the receiving device being operative to ascertain the vehicles position with respect to the TCD and determine a preferred rate of speed so as to arrive at the TCD while it is in the "green" state, thus avoiding the deceleration, waiting at the TCD and acceleration to driving speed.

The TCD can transmit the requisite information from its location using a broad or narrow beam of RF or microwave transmission, optical transmission or a series of more localized transmitters dispersed about the roadway.

The vehicle can determine its current position through GPS, detection of embedded sensors in the roadway, Doppler radar and like methods to measure the actual distance from the TCD, which can also be determined by the combined information received from the TCD transmission and other sources.

Figure 1:
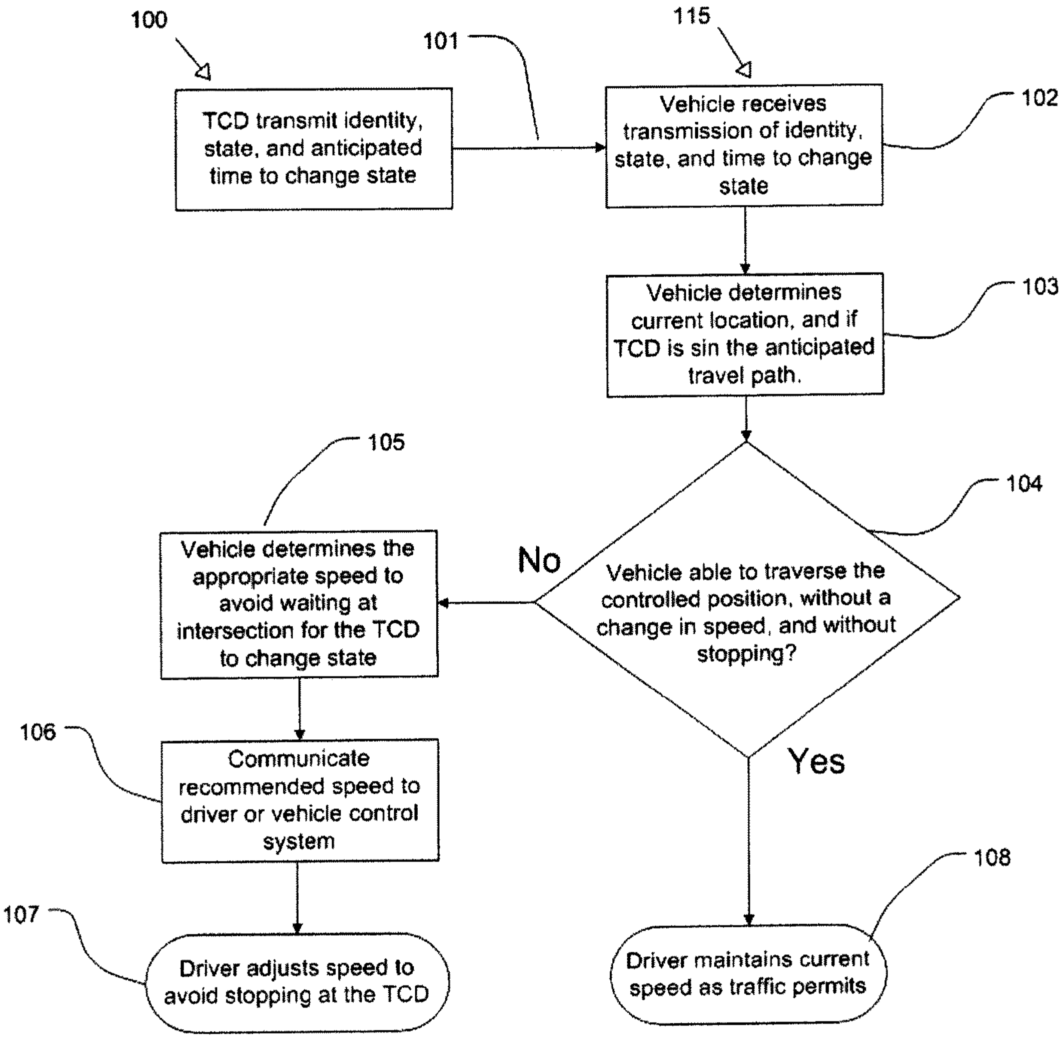
FIG. 1 is a flow chart illustrating the operative principle operative in the first embodiment of the system.
Figure 2A:
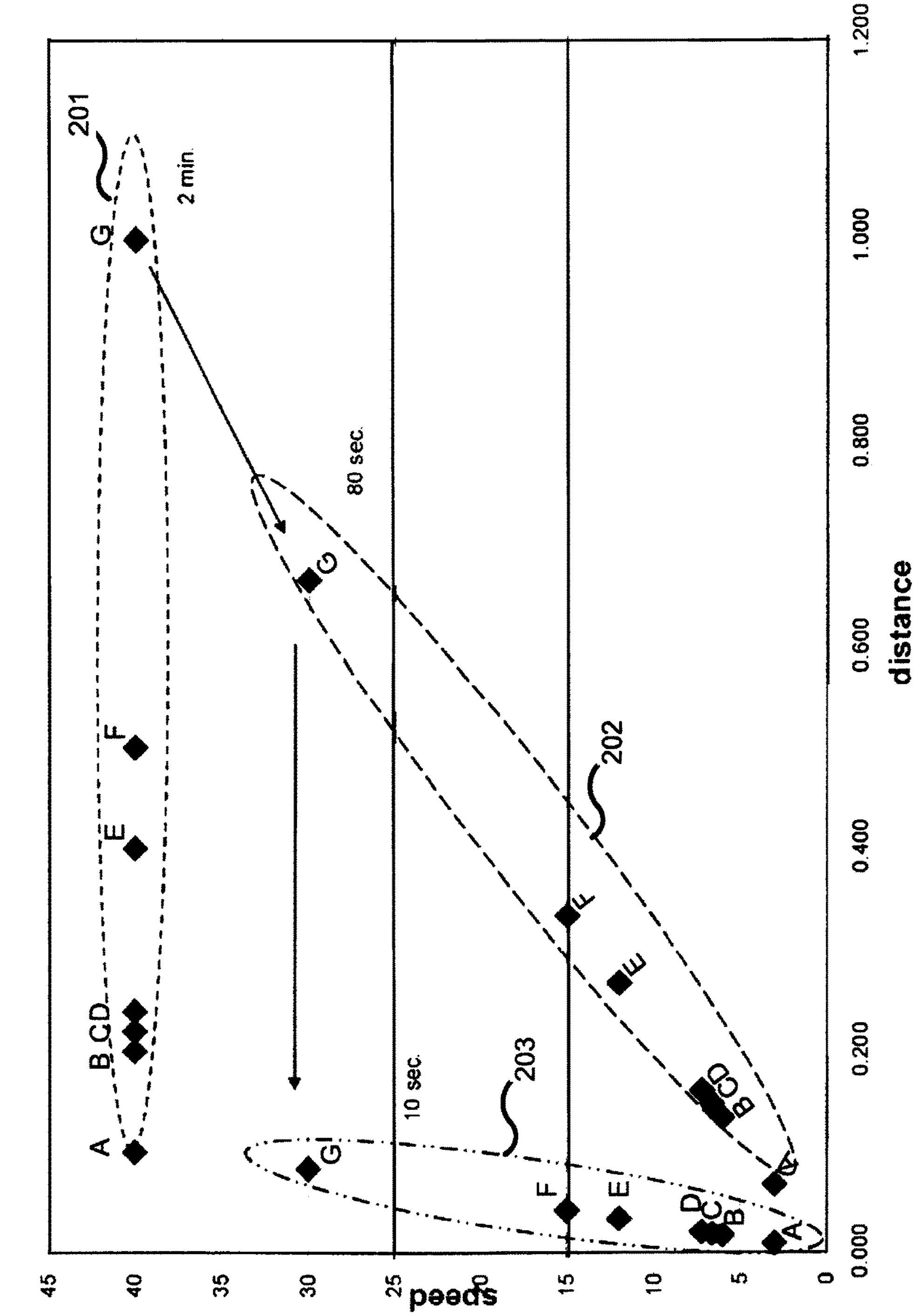
FIG. 2A is a plot showing the speed and position of a cluster of vehicle subject to the control systems and devices described with respect to FIG. 1.
Figures 2B, 2C, 2D:
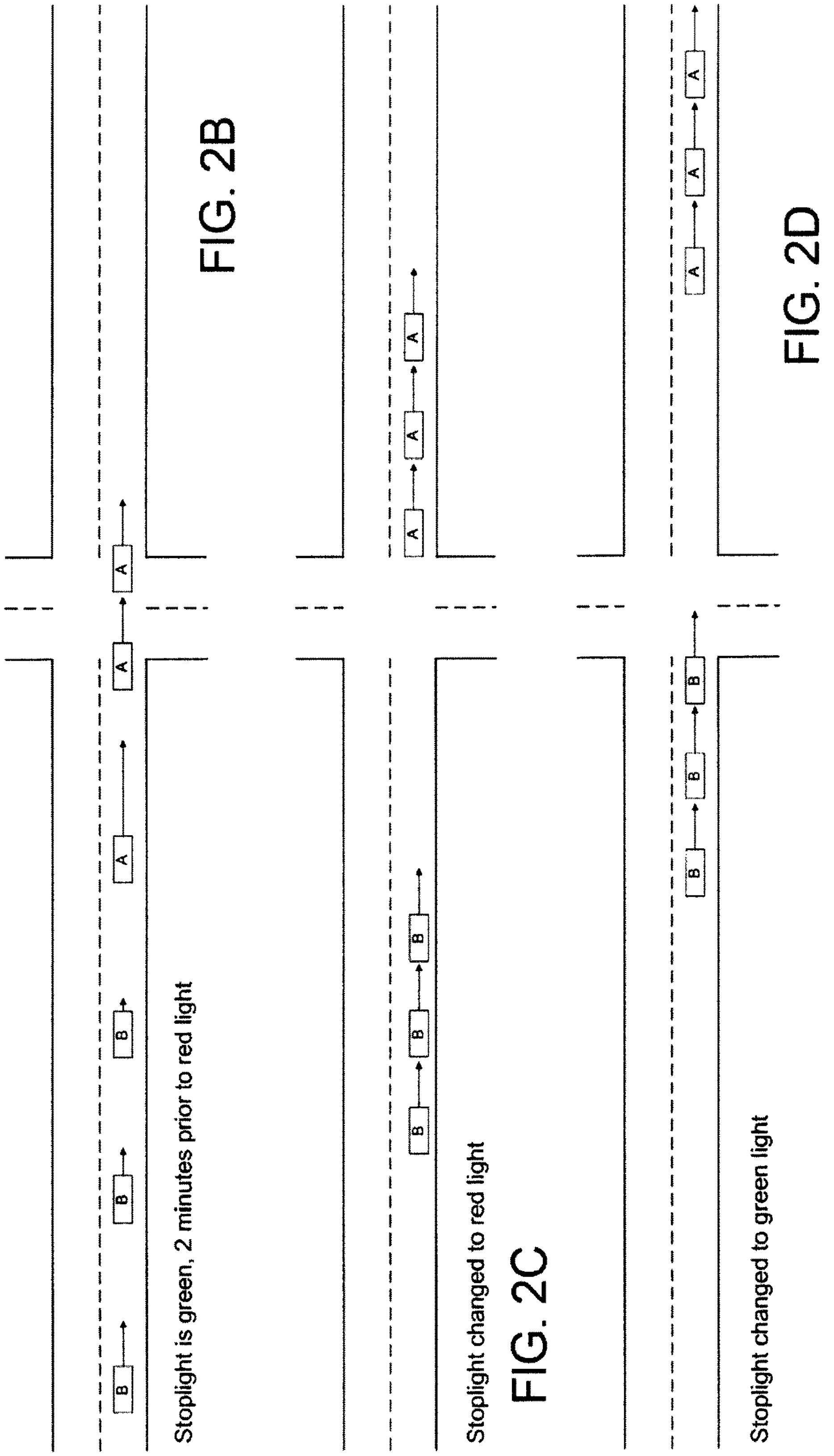
FIGS. 2B, C and D are plan views of an intersection corresponding to the time intervals plotted in FIG. 2A.
Figure 3:
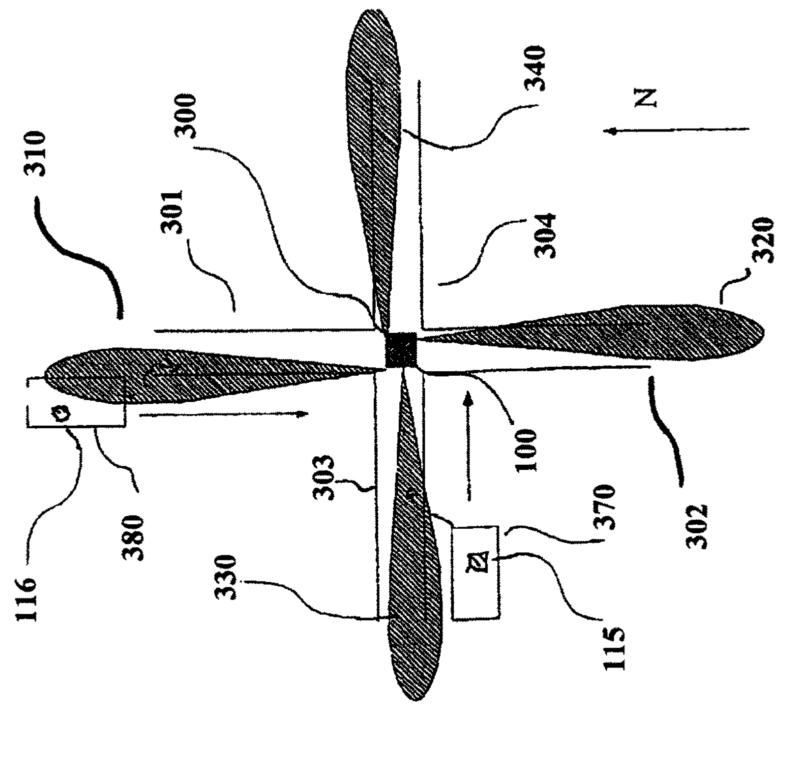
FIG. 3 is plan view of an intersection illustrating one embodiment for communicating with a plurality of vehicles according to FIGS. 1 and 2.

FIG. 3 is a plan view of an intersection illustrating one embodiment for communicating with a plurality of vehicles according to FIGS. 1 and 2. As vehicles approach the intersection from four directions, the TCD broadcasts a signal to four sets of approaching vehicles. In this embodiment the broadcast patterns is narrow and corresponds substantially with the width of the roadway to avoid signal overlap and confusion with adjacent TCDs that also broadcast signals.

Figure 4:
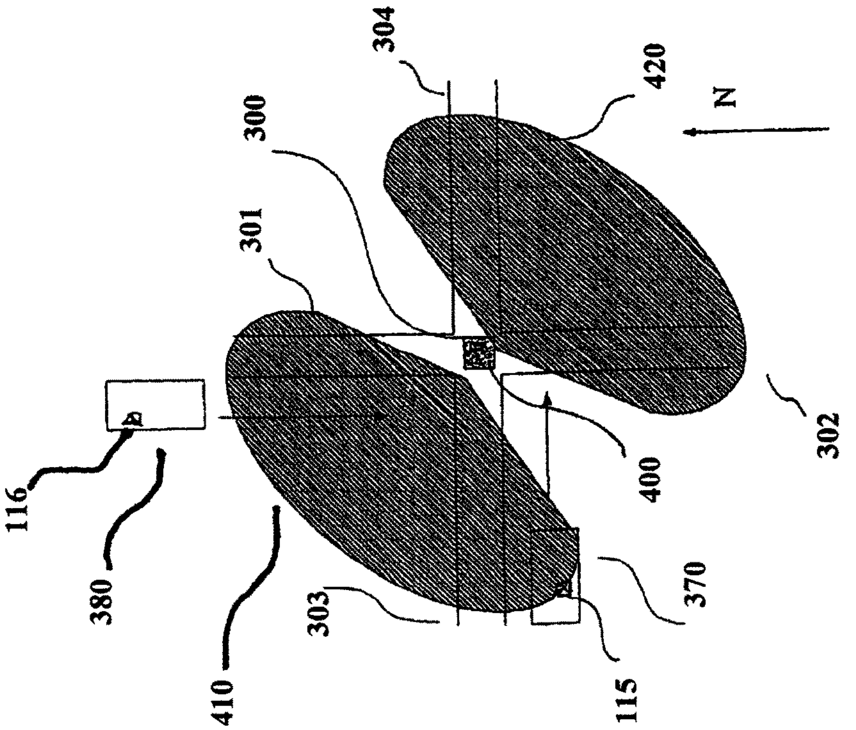
FIG. 4 is plan view of an intersection illustrating another embodiment for communicating with a plurality of vehicles according to FIGS. 1 and 2

A traffic control device (TCD) 100 is operative to transmit or broadcast signal to approaching vehicles, wherein the approaching vehicles uses the information received as set forth in the flow chart in FIG. 1. Thus, the composite signal received by approaching vehicles in step reflects the state and timing of the control device, and depending on the transmission or broadcast scheme deployed, examples of which are illustrated in FIGS. 3 and 4, the location and identity of the TCD, and other information necessary for vehicles approaching from a specific direction to distinguish the appropriate signal from that of signals meant for vehicles approaching from a different direction.

Vehicles are in turn equipped with a device 115, for vehicle 370 and 116 for vehicle 380 to receive the composite signal and determine an appropriate speed that would permit them to safely reach and traverse the controlled intersection without the need to stop at the intersection when the control device permits cross traffic through the intersection. Thus, vehicles would avoid waiting in line at intersections, as well as the idling of the engine that wastes fuel and increases pollution. Further, as traffic flow would not be retarded by the time consumed when each vehicle in a line accelerates from a stopped position (sometimes referred to as "the accordion effect"), the overall traffic capacity of roads would be increased.

Thus, in step 101 in FIG. 1 the TCD transmits its identity, state and anticipated time to change state. Device 115 is embedded or associated with the vehicle, in step 102 receives the transmission of the TCD identity, state and time to change state.

In step 103 the vehicle determines its current location with respect to the TCD, and if the TCD is in anticipated travel path.

In step 104, Device 115 is operative to determine if the vehicle will be able to traverse the controlled position without a change in speed, thus avoiding having to stop.

In the event that step 104 determines that the vehicle cannot traverse the intersection without reducing speed (No branch to step 105), in the next step 105 device 115 determines the appropriate speed to avoid waiting at an intersection for the TCD to change state.

In step 106, which follows step 105, device 115 communicates a recommended speed to the vehicle's driver, or alternatively automatically lowers the speed or a cruise control maximum speed threshold for the vehicle. In the former case, the driver adjusts the speed of the vehicle, step 107, to avoid waiting at the intersection.

In the event that step 104 determines that the vehicle can traverse the intersection without reducing speed (Yes branch to step 104), in the next step 108 the driver maintains the current speed until device 115 instructs or otherwise controls the vehicle in response to a signal received from the first TCD 100, another TCD or other elements of the traffic control system.

FIG. 2A-D illustrate the operative principle with vehicles which are approaching an intersection. In FIG. 2A, vehicles labeled as A-G initially approach at constant speed, being at varying distances from the intersection. As a first approximation to implementing the system, we now calculate an ideal speed to avoid stopping at the intersection, based on a change from red to green in 2 minutes. It is a simple matter to compute the maximum speed below the speed limit by dividing the distance to the intersection by the time remaining until the TCD turns green.

FIG. 2A further illustrates the results of such computations in a graphic format wherein the speed of each vehicle is plotted on the ordinate as a function of distance from the intersection, with the speed plotted on the abscissa. The plots are made for 3 time intervals, the first interval, marked by region 201, being at 2 minutes before the light will turn from red (the current state) to green, when all vehicles are traveling at the speed limit (40 mph). The other two sets of points highlighted within the border of regions 202 and 203 respectively represent the position and speed of the same vehicles 80 and 10 seconds prior to the light changing. The vehicles closer to the intersection during the red condition will be slowed more than vehicles more distant. Thus, as time elapses the vehicles tend to cluster into groups. It should be appreciated that while the TCD is green, the group of vehicles that can safely traverse the intersection will be instructed to travel at a certain speed, subject to traffic conditions, and thus may be allowed to accelerate up to or even beyond the speed limit to optimize the spacing and speed of the group relative to other groups fore and aft.

FIG. 2B illustrates the operative principles with two clusters of cars identified as cluster A and cluster B by the letter on each vehicle, all traveling from left to right as they approaching the intersection. At some time during their approach, in this case 2 minutes prior to the light changing to red, the cars are traveling at constant speed, and are located at varying distances from the intersection. Based on their distances to the intersection, and the speed of the cars, those cars in cluster A will pass through on the current green light cycle, and cluster B will be required to slow down in anticipation of the light turning from green to red. In this manner, cars in cluster B continue moving but do not arrive at the intersection until the next green light. In the manner described above, we can calculate if any of the cars in cluster A will be required to increase their speed in order to cross the intersection during the current green light. In FIG. 2B-D, the relative magnitudes of the velocities of each vehicle are indicated by the magnitude of the corresponding vector.

The plan view in FIG. 2C shows the cars at the intersection as the light changes to red. The vehicles closer to the intersection during the red condition will be slowed more than vehicles more distant. Thus as time elapses the vehicles tend to cluster into groups. The cars in cluster B are shown grouped together and traveling at the ideal speed to avoid stopping at the light. It should be appreciated that while the TCD is green, the group of vehicles that can safely traverse the intersection will be instructed to travel at a certain speed, subject to traffic conditions, and thus may be allowed to accelerate up to or even beyond the speed limit to optimize the spacing and speed of the group relative to other groups fore and aft. Therefore, the cars in cluster A are shown after having passed through the intersection, grouped together closely and traveling at the same speed. The plan view in FIG. 2D shows the intersection as the light turns green. Cluster A is continuing on beyond the intersection, and cluster B has reached the intersection, and is accelerating as a group, back up to the normal speed of traffic on the road.

FIG. 3 is a plan view of an intersection of two roads at intersection 300. The road carrying north-south traffic has a first segment 301 in which vehicle 380 is traveling southbound as it approaches the intersection with TCD 100, whereas segment 302 carries northbound traffic. The road carrying east-west traffic has a first segment 303 in which vehicle 370 approaches intersection 300 from the west, whereas segment 304 carries traffic that approaches intersection 300 from the east. In this example, the TCD broadcasts a separate directed signal to approaching traffic, that is broadcast signal 330 for vehicles approaching on segment 303, signal 340 for vehicles approaching on segment 304, signal 310 for vehicles approaching on segment 301 and signal 320 for vehicles approaching on segment 302. Thus, vehicle 370 on segment 303 is intended to be responsive to the information in broadcast signal 330, as received, analyzed and communicated by device 115 there within. Whereas vehicle 380 on segment 301 is intended to be responsive to the information in broadcast signal 310, as received, analyzed and communicated by device 116 there within. Naturally, there could be one transmission signal for each intersection or road with multiple intersections or an area wide signal that carries all the necessary data. This data could then be analyzed by each vehicle's reception device so that only pertinent information is displayed to the driver.

FIG. 4 is a plan view of intersection 300 illustrating another embodiment wherein TCD 400 utilizes fewer, but broader signal broadcasts, signal 410 covering vehicles on segments 301 and 303, while signal 420 covers vehicles in segments 302 and 304. This embodiment differs from that illustrated in FIG. 3 in that the broadcast pattern is broad, and not limited to a particular section of roadway, as the devices provides a code multiplexed signal that includes information pertinent to vehicles approaching from two or more directions wherein the vehicles select the appropriate code relevant to their direction of travel or approach to the intersection. This is particularly beneficial if the vehicle's driver is being prompted to follow a course set out in a GPS enabled navigation system, as the computation system can be programmed to identify TCD's that correspond to the planned travel route, and to the extent it can intercept multiple TCD signals within the route, assist the vehicle driver to maintain a speed that optimally permits the traverse of multiple controlled intersections with the minimum acceleration and deceleration.

In alternative embodiments, a vehicle speed controller is operatively responsive to device 115, for example a cruise control system and may take into account the acceleration characteristics of the vehicle.

In another aspect driver displays/guides and vehicle control systems are used to control the length of time for green, yellow, and red lights, the spacing between vehicles and groups of vehicles (pods), and the size of pods. This traffic flow system can also include a method for placing vehicles in pods or groups so that vehicles can be coordinated to travel with increased efficiency of traffic flow. In this aspect, device 115 may also have the capability of communicating vehicle information to the TCD system, which is a network of devices such as TCD 100 throughout the entire roadway system. This information may include but is not limited to its position on the roadway, whether or not it is travelling in a pod, and if so, its position within the pod and the size of the pod. Determination of whether a vehicle is in a pod and/or its location within a pod may be calculated through a combination of means. These means include but are not limited to inter-vehicle communication of GPS based position information, GPS based position information of vehicles transmitted from the TCD system, traffic signal or roadway based RF, optical, and proximity sensors, and vehicle mounted RF, optical, and proximity sensors. The device 115 may communicate to the TCD system directly via means including but not limited to, satellite, long range RF, or cell phone network based data communication. Device 115 may also communicate indirectly to the TCD system via RF transmissions to a receiver in TCD 100 located at the nearest traffic light, or to relay stations located along the roadway. Utilizing this pod information, the TCD system is capable of determining whether the spacing between pods permits the addition of new vehicles to the pod in a controlled sequence. The pods and the crossing lights are then coordinated to maintain vehicle/pod speeds so that intersections can be crossed without the need to stop. Generally in such pods the cars are spaced at a minimum distance that is safe for travel at a high speed, but each pod is separated from the next nearest pod by a much larger distance, typically at least the length of the pod, which includes the vehicles and the spacing between them.

Additional technologies exist to allow data communication between any fixed elements of the TCD system by utilizing microwave transmitters, land lines such as phone, fiber-optics, coaxial cables, wireless networks, or other future technological means.

In some cases, the traffic flow system may be used on a roadway having intersections that are a relatively short distance apart. There may be pods formed whose length exceeds the distance between the intersections. In this case, the traffic flow system coordinates the timing of the lights at each of the intersections. This ensures that the lights are kept in the green state, allowing the entire pod to travel through both intersections and maintaining optimal traffic flow.

In yet another aspect the vehicle includes onboard speed/brake controlling systems that synchronize vehicle speed with intersection crossing so that the driver is not required to manually control the vehicle's speed.

In yet another aspect the vehicle includes onboard speed/brake controlling systems that allow the vehicle to automatically maintain following distance behind another car. In the case where the vehicle is travelling as part of a pod, but is not the lead vehicle, this will allow the vehicles to maintain accurate and safe grouping even while travelling at high speeds. This system will require inputs in order to determine whether the vehicle is leading or following. Input means may be through communication with the TMS, inter-vehicle communication, user input, or external vehicle sensors. In addition sensors are required to determine the vehicle range. Range finding technologies that may be utilized include, but are not limited to, ultrasound, laser, and radar.

In yet another aspect, vehicles entering a road are required to stop and wait for a pod to approach and then are directed, manually or automatically, to take a position in a given lane at the front or rear of the pod. Vehicles waiting for a pod can park on both sides of a lane(s) for travel in one direction. The number of vehicles allowed to join a given pod can be controlled to maximize the flow of traffic.

In yet another aspect, vehicles awaiting a light change at an intersection are required to wait a distance away from the intersection so that they can begin to accelerate prior to the light changing in order to maximize the number of cars that can pass through the intersection during the computer-controlled period. The period is controlled by the number of vehicles waiting to pass through the intersection and the priority given to the traffic demands on that road versus the traffic demands on the intersecting or cross road.

In yet another aspect stop/yield signs (or any sign) can be fitted with a transmitter/receiver device and indicator lights that signal an approaching vehicle if another vehicle is approaching the intersection via another road. The signal would be actuated by an approaching vehicle's transmission of data as to speed, time to crossing, intended travel path, and it would take into account other vehicles approaching the intersection from another road or direction of travel. The integrated stop sign/signal could be controlled by on board vehicle computers that synchronize with other vehicle computers approaching the intersection or by a simple computer integrated in the sign/signal. Once again, vehicle speed could then be controlled so the approaching vehicles would cross the intersection at different times.

In yet another aspect, the signals could also be used to enforce speed limits on different roads. For instance, on a residential street an integrated stop/yield signal would only signal a stop for vehicles exceeding the speed limit by a given percentage, whereas vehicles obeying the speed limit would be given priority and allowed to roll through the intersection rather than being required to stop. Less air pollution would be generated by allowing vehicles to roll through stop sign intersections in residential areas. The onboard vehicle systems could be turned off or on by the driver.

In yet another aspect, vehicles use mapping programs to communicate with the central traffic system the intended travel path for maximizing the flow of traffic. For instance, a certain vehicle's travel path may lead to a congested area several miles ahead and a faster, secondary path could be recommended. Also, if the secondary path is not chosen then the vehicles progress may be slowed or even pulled to the right lane and slowed or pulled off the road and stopped, thus allowing vehicles with faster or less congested travel paths to receive a higher priority than the vehicle traveling toward a congested area.

In yet another aspect, emergency vehicles would be given total or partial over-ride priority at intersections and on roadways. Partial over-ride priority could involve timing changes to lights/signals that might slightly slow the progress of the emergency vehicle so that its travel is safer and less disruptive to traffic flow. In addition, travel path data indicating congested roads and faster travel paths could be used to improve destination arrival times.

In yet another aspect, the communication between the vehicle and the signal light at an intersection could be used to prevent collisions from crossing traffic. For instance, a disabled vehicle may be unable to stop causing it to run a red light. A vehicle that continues to move toward the intersection would be detected by the control system that would then prevent the intersection signal from turning to red or if the signal had already switched then all intersection signals could immediately switch to red and begin flashing. An alarm could also be sounded at the intersection and inside all vehicles traveling toward the intersection.

In yet another aspect vehicles fitted with an onboard system(s) that would function as described above could be used to guide the speed of vehicles that are not fitted with a system. For instance, a special indicator light could be used by the fitted vehicle to inform an unfitted vehicle of the optimum travel speed, etc.

In yet another aspect vehicles that do not utilize this technology or that are awaiting a light change are required to travel or wait in a designated lane to allow other lanes free for vehicles using the technology or vehicles traveling at a speed toward the intersection for the light to change.

Figure 5:
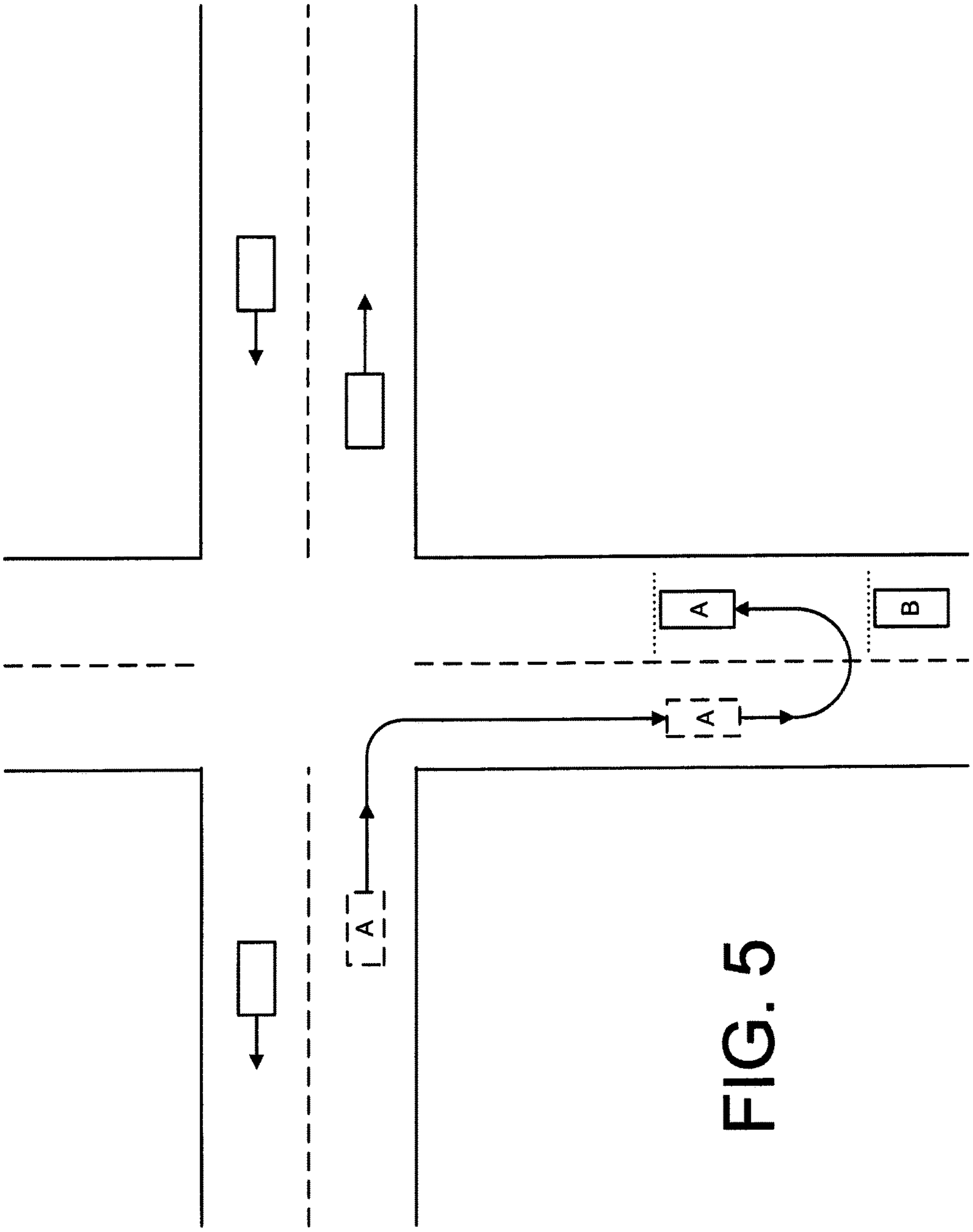
FIG. 5 is plan view of an intersection illustrating another embodiment for communicating with a vehicle that enables the vehicle to make a left turn when the traffic control light governing its travel direction is green.

Another embodiment is illustrated in FIG. 5 that enables vehicles in pods to make left-hand turn on a green light. Thus, the TCD or traffic control system, directs vehicles that seek to turn left at the intersection (vehicle A) to first make a right hand turn, then perform a U turn, after which they hold at intersection. Vehicle A is traveling toward the intersection, currently with a green light to cross, but wishes to turn left. There is currently no green for the left turn, so that through traffic can be maximized. In order for vehicle A to make the left turn. It first turns right at the intersection, then immediately performs a U turn and stops at a holding line some distance behind the threshold of the intersection. The holding line is located far enough back from the threshold of the intersection to allow for full vehicle acceleration prior to entering the intersection. When the light changes, vehicle A crosses and travels across the intersection, effectively having performed a left hand turn from its initial direction of travel. In order for vehicle A to have enough room to perform the U-turn, cross traffic such as vehicle B must stop behind a second holding line as shown in FIG. 5. Vehicles B and then A are signaled to begin moving prior to the light changing, so that they cross the threshold at full speed at a specific interval after the light changes to green.

Figure 6:
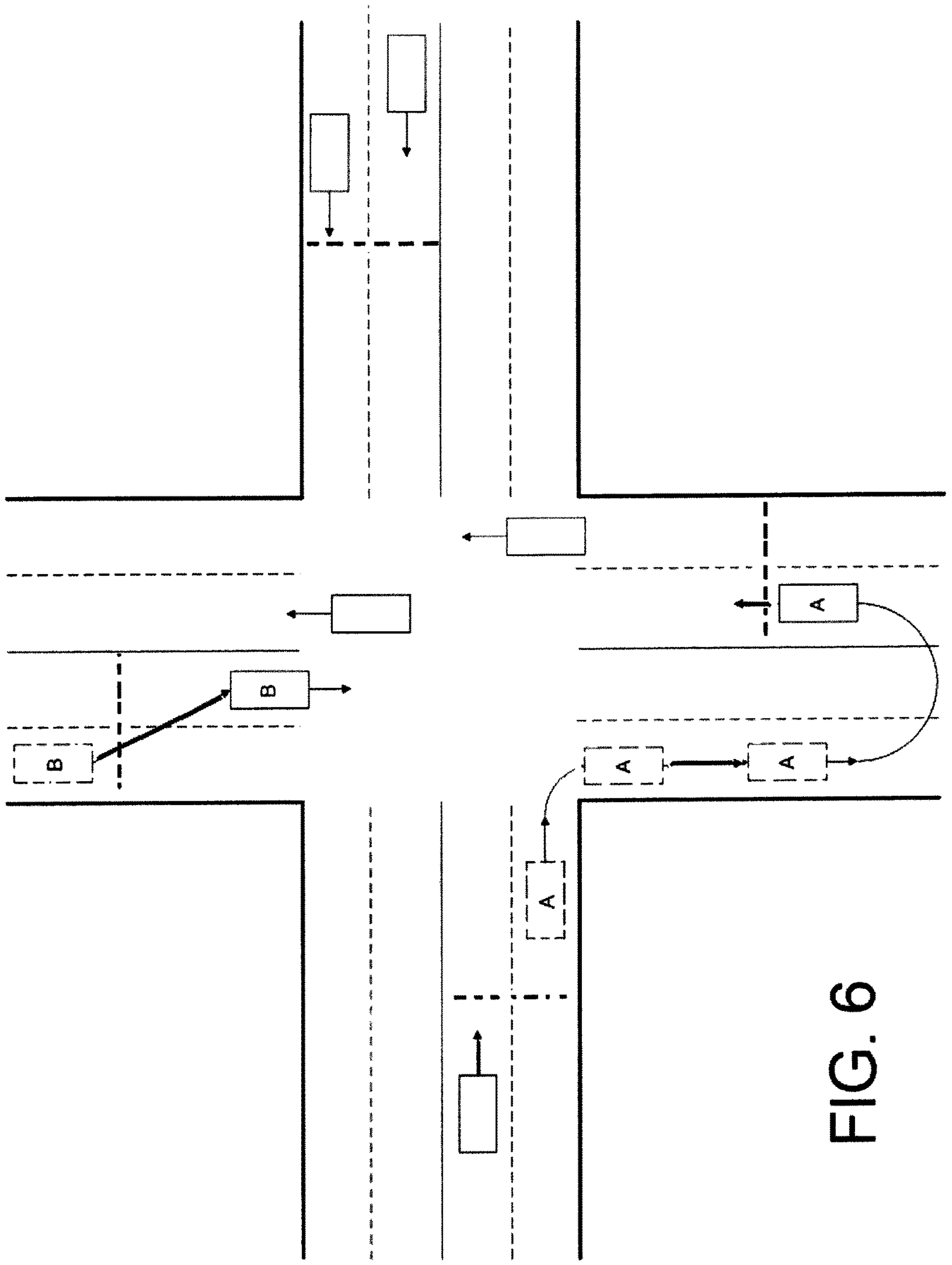
FIG. 6 is plan view of an intersection illustrating another embodiment for communicating with a vehicle that enables the vehicle to make a left turn when the traffic control light governing its travel direction is red.

FIG. 6 illustrates another alternative embodiment in which a vehicle is able to make an effective left-hand turn on a red light. When vehicle A approaches the intersection traveling from left to right with a red light and wishes to make a left turn, it turns right (downward on the drawing) at the intersection and then holds on the shoulder or in the right hand lane (as shown). Note that space is provided so that multiple cars may be holding in this location (as shown by the dotted vehicle outlines in FIG. 6) Cross traffic (moving up and down on the drawing sheet) such as vehicle B has the green light, and continues to travel across the intersection. If vehicle B is in the right hand lane (as shown), it is signaled either by display on a sign, an indication in the vehicle, or both, to change lanes to the left hand lane in order to de-conflict with traffic (such as vehicle A) holding in the right hand lane. Once cross traffic is clear, vehicle A performs a U turn and continues travel across the intersection, effectively having performed a left hand turn from its initial direction of travel.

Another embodiment maximizes vehicle travel efficiency by grouping vehicles into pods as soon as possible, and preferably to the maximum extent possible. If a pod is not immediately approaching as the vehicle turns onto the TCD equipped roadway, it is given a signal to hold on the far right of the road, or on another suitable holding area such as a center median. This is shown with vehicle A in FIG. 7A. It waits there until a pod approaches, and based on the speed of the pod, the system determines the appropriate time for the vehicle to begin accelerating. The vehicle merges over to the appropriate lane, and then joins the pod. The vehicle may join at the position at the rear of the pod, or if automated vehicle control systems are used, at the front of the pod. FIG. 7B thus shows vehicle A joining behind vehicles labeled C that travel in a pod.

In a further embodiment, vehicles entering onto the TCD equipped roadway will have destination information entered into a navigation system. The TCD uses this information to determine the exit and approximate estimated time of arrival at that exit. The system determines the volume of traffic that will be exiting at that time of arrival. Based on that volume, the system determines if capacity limitations will be exceeded. If so, the system has the vehicle pause in the holding area until joining the next pod which will allow the system to remain within its capacity requirements. Thus FIG. 7A also illustrated such a situation in that it shows car A waiting for pod B to pass, since entering this pod would exceed system capacity at the time which A will be exiting. The as shown in FIG. 7B, car A is shown merging into the traffic lane and joining at the tail end of pod C. Thus, the grouping of the pods becomes determined by the destination of the vehicles within it, in order to avoid having too many vehicles reach the same exit at the same time. One of the critical system capacity limitations is the area for holding vehicles which intend to make left turns, and have exited to the right and have performed a U turn via the method described in FIG. 5. The area where these cars are waiting to accelerate and cross the road can only hold a finite number of cars before reaching the area where the traffic behind it (shown by vehicle B in FIG. 5) is located.

Figure 7A:
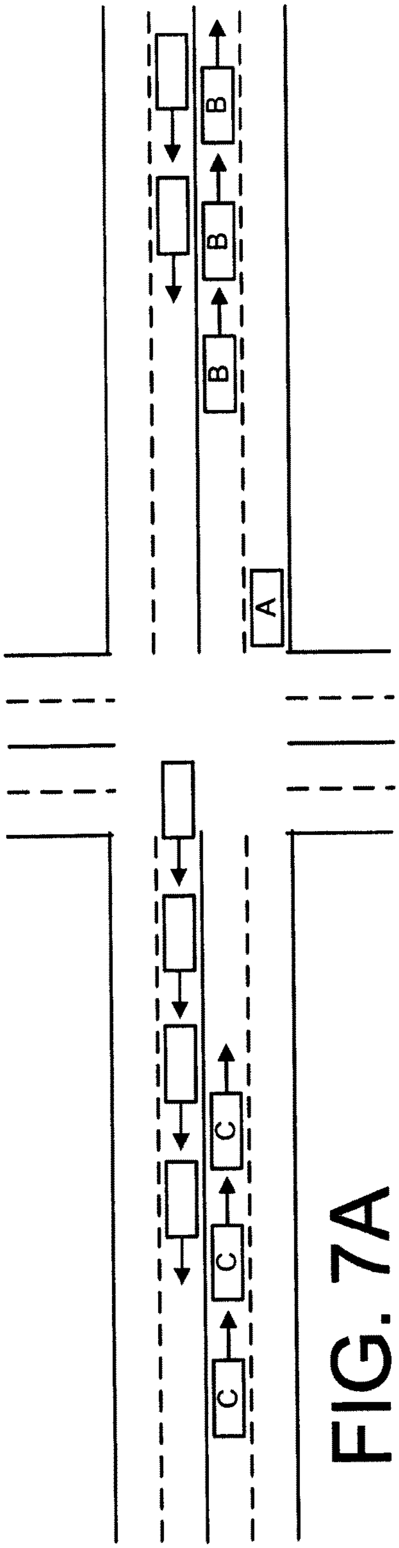
FIGS. 7A and B are plan views of an intersection showing the stages where a vehicle waits to join a pod that is about to traverse an intersection.
Figure 7B:
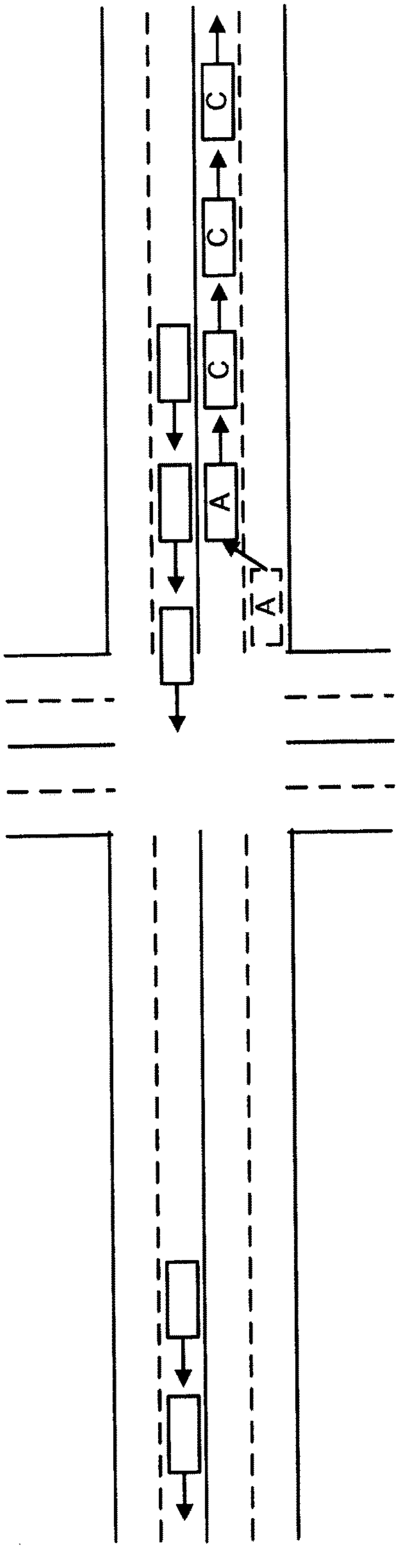

In more embodiments it is preferable that a vehicle waiting as shown in FIG. 7A to join a pod receives notification of events that permit it to join the pod safely and efficiently. Such notification may include, without limitation, the time remaining until traffic signal changes color, as well as other information that would prompt the driver to enter the pod, such as a preliminary notification that they will be instructed to join the next pod, a countdown to start of acceleration necessary to join the pod, either at the front or rear, and a target speed to reach on acceleration. The driver notification may include but not be limited to visual stimuli in graphical, digital, analog, numerical, or color-coded displays, audio stimuli in the form of voice or tones, or touch stimuli in the form of vibration or motion.

As the TCD system in the preferred embodiment has the capability to monitor the cars compliance with instructions for entering pods, it is also possible to log such data and quantify the drivers reliability and hence skill in performing such maneuvers. Thus, it is desirable to constantly evaluate the driver's adherence to the traffic laws, and ability to drive their vehicles in accordance with the system recommendations for maintaining constant speed, accelerating, decelerating, and executing lane changes. In addition, a driver's reaction time and smoothness of driving style may also be factored into the evaluation. More preferably drivers are ranked or scored based on these evaluations. When drivers enter the TCD system, it is most preferable that their placement at the front of the pod only occur when they have demonstrated a pattern of skill and instruction compliance that it is likely that the entry to the pod will not be dangerous or slow the pod, if they do not have such a rating then they would be placed at the rear of the pod, due to a lower ranking. Further, as the last car in a pod can safely de-accelerate without changes lanes when it desires to exit the pod, it is also preferable to arrange or order cars in a pod with the last car exiting first. Thus it is also preferable to take both skill ranking and the vehicles intended exit location, which can be communicated with the traffic control system via the vehicle's GPS navigation plan, into account when deciding which pod a car should enter. Thus, drivers with the lowest skill ranking would only enter at the end of a pod of cars when they will be the first car in the pod to leave the pod. Furthermore, in an alternative embodiment, continuous evaluation of driving performance would be performed by the TCD. At any occurrence of driver error or inattentiveness this would allow it to immediately re-order the vehicles within a pod, placing the erring driver toward the rear.

Further, another aspect is providing rules of traffic flow that enable pods or clusters of vehicles to travel unimpeded by vehicles that are not capable of communication with the traffic control system that manages pod formation. For example, vehicles not participating in the traffic control system would not be allowed to pass pods and/or travel on the same lane or possible roadway as pods.

Figure 8:
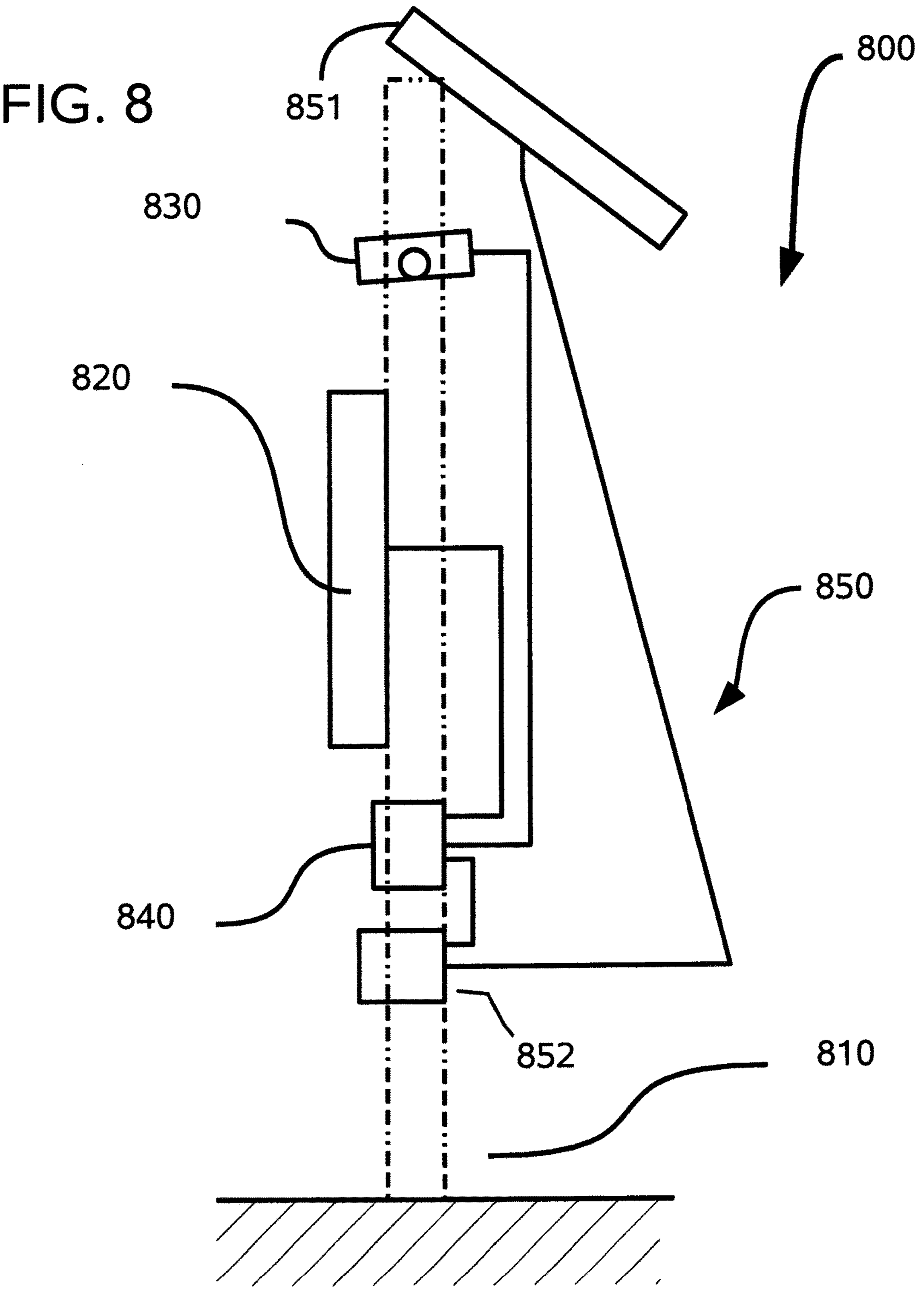
FIG. 8 is a schematic cross sectional elevation of an agile traffic sign.

In FIG. 8, there is illustrated yet another embodiment in which an agile traffic signal device (ATSD) 800 is shown, being mounted above the ground on structural support 810. The ATSD comprises an electronic display 820 in signal communication with a computation unit 840. The computational unit 840 is informed of the speed of approaching vehicles by the speed detector 830. It is also an embodiment that such an ATSD 800 can also act as a TCD and communicate with vehicles as described above, and in particular determining if the vehicle is compatible with the traffic control system automation and providing instructions as appropriate. For example, non-compatible vehicles might be directed to stop, rather than yield or directed to different lanes.

Figure 9A:
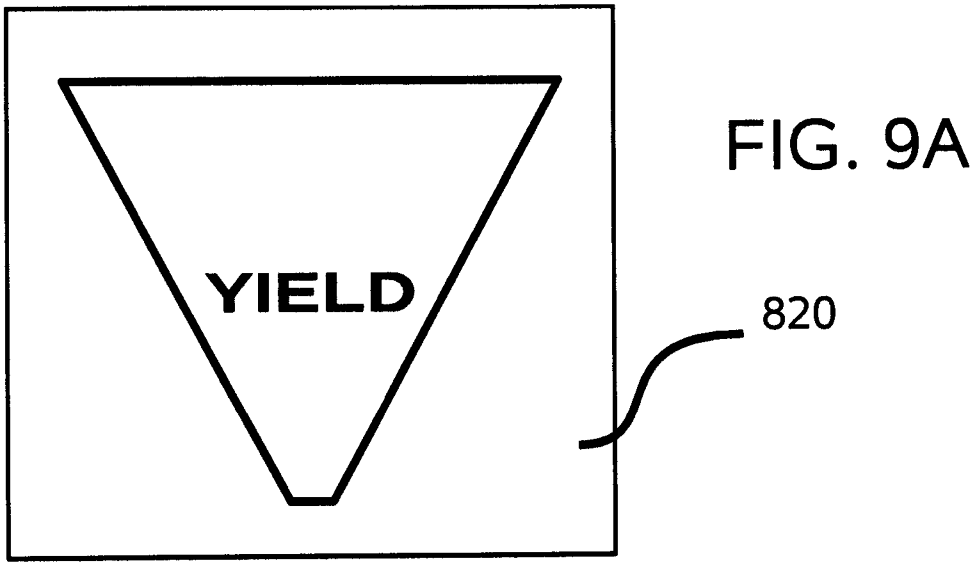
FIGS. 9A and 9B are elevations of the display portion of the agile traffic sign of FIG. 8 showing representative examples of alternative states.
Figure 9B:
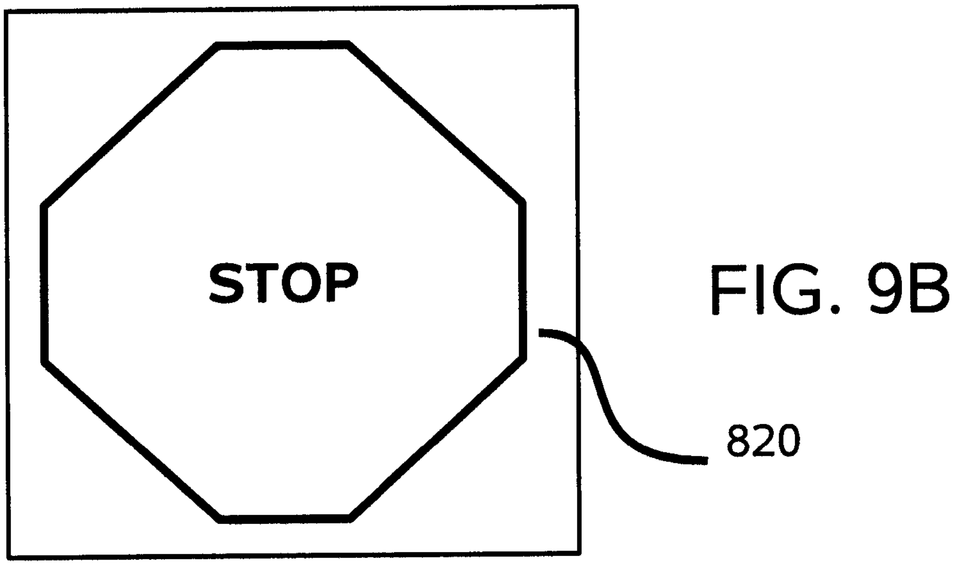

FIGS. 9A and 9B illustrate the ATSD as visible to drivers in different states determined by computational unit 840 in response to the vehicle speed or acceleration as determined by motion sensor 830. The motion sensor 830 preferably measures the speed directly, such as a Radar gun or LASER beam speed detector and the like. The speed detector may optionally deploy proximity, pressure, or movement sensors embedded in the roadway. The vehicle speed is reported to the computational unit 840. If the vehicle is traveling at a safe speed for the prevailing traffic conditions, including the presence of cross-traffic the vehicle is intend to merge into, the state of the sign remains as shown in FIG. 9A, a convention merge or yield sign. It is also an embodiment that such an ATSD 800 can also act as a TCD and communicate with vehicles as described above, and in particular determining if the vehicle is compatible with the traffic control system automation and providing instructions as appropriate. For example, non compatible vehicles might be directed to stop, rather than yield or directed to different lanes.

However, if it is determined that the vehicle is traveling too fast or road conditions are unsafe for any merge, then the computational unit 840 is then operative to switch the display unit 820 to that shown in FIG. 9B, where the vehicle is directed to stop. The display unit 820 is optionally operative to be in the form of or display a conventional 3-color intersection control light (i.e. red, yellow or green). In this mode, it is preferable that the agile sign 800 have two or more vehicle detectors pointed at cross streets in the intersection. When it is detected that no vehicles are approaching the intersection in a first direction, the vehicles approaching in the cross-direction have a green light. However, if vehicles are approaching from both directions, vehicles from one direction would be scheduled to receive a red light, when the other vehicles cross, and would thus be alerted by the TCD to change speed in order to avoid having to stop, being scheduled to receive a green light as soon as the first set of one or more vehicles approaching in the cross direction pass the intersection. Thus the ATSD 800 would time the alternating red and green lights based on traffic demand, as well as communicate the signal timing as discussed in other embodiments.

The ATSD 800 is optionally powered by direct wiring to a power source 850, like most conventional traffic lights, or is optionally powered as shown by an overhead PV cell 851, which more preferably continuously charges battery 852, which directly powers computational unit 840 and the display 820.

Figure 10:
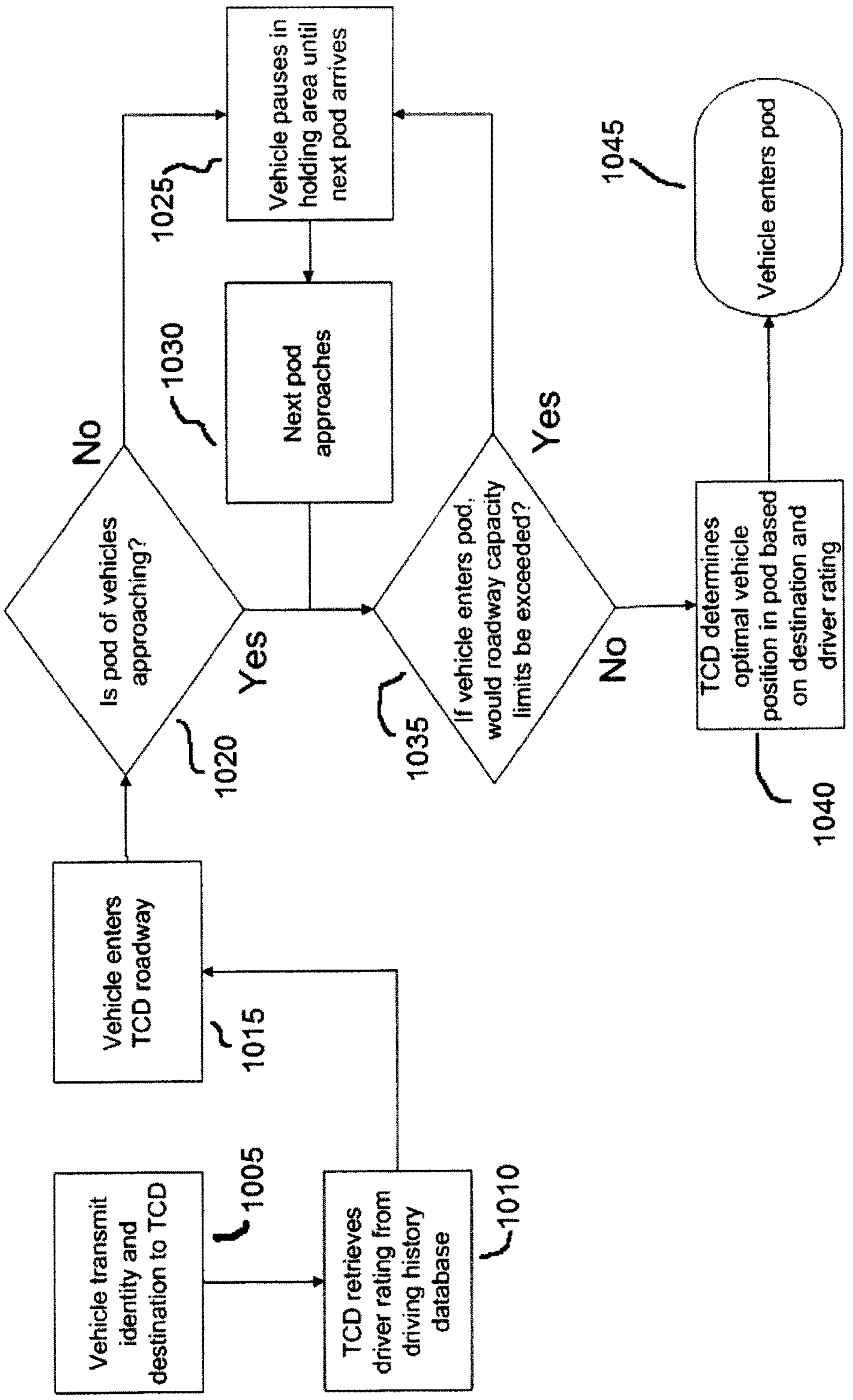
FIG. 10 is a flow chart of another embodiment for controlling and arranging vehicles in pods.

FIG. 10 is a flow chart illustrating the method by which the traffic control system manages the pod formation in accordance with the embodiments shown in FIG. 5-7. In step 1005 the vehicle transmits its identity (and/or the driver identity) and destination to the traffic control system or TCD. Then the TCD retrieves the driver history the driving history database in step 1010. Then in step 1015 the vehicle enters the TCD controlled roadway, and is in communication with the traffic control system. The traffic control system in step 1020 determines if a pod of vehicles is approaching and if not (No branch) then the vehicles is directed in step 1025 to pause in a holding area, where it can await the arrival of the appropriate pod. Such location is optionally without limitation either at a holding lane or space or by travelling in a lower speed lane. When a pod is approaching, step 1030 or Yes branch from step 1020, the traffic control system determines if adding the subject vehicle to the pod would cause the roadway to exceed capacity, if Yes then the vehicle continues to hold, step 1025. If No, then in step 1040 the TCD or traffic control system determines the optimal position in the pod based on the driver destination, rating or a combination of the same. Depending on the determination in step 1040 the driver receives instructions or the vehicle is controlled by the traffic control system and enters the pod in step 1045.

Figure 11:
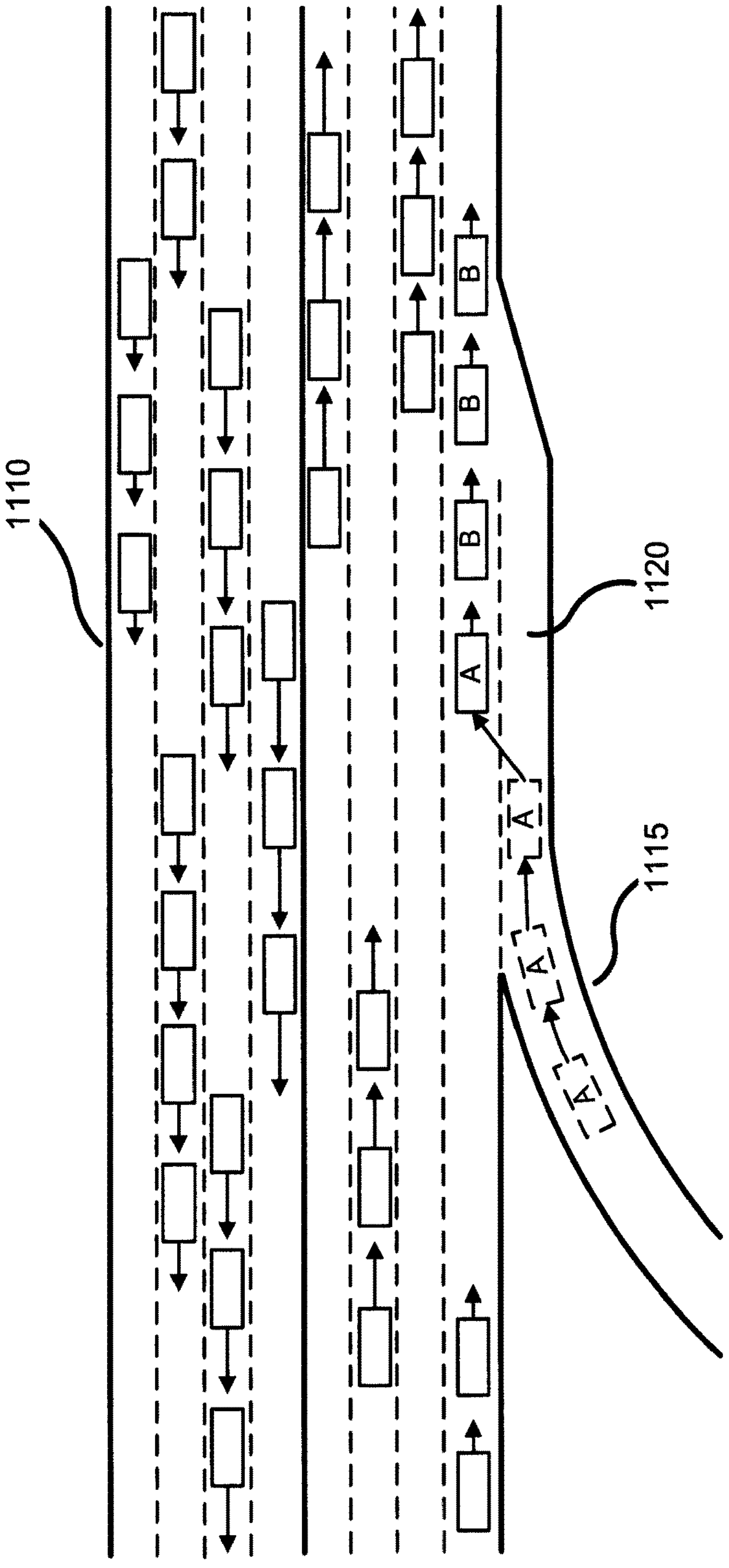
FIG. 11 is plan view of a high speed multi-lane roadway illustrating an embodiment for optimizing flow on a highway or freeway.

In yet another aspect, freeway traffic can be more safely managed by transmitting to vehicles speed changes to help prevent major slow downs or stops by better managing vehicles speeds as they approach congested traffic zones. Applications of this embodiment may include but are not limited to a highway, freeway, or a toll road. Radio/laser (or the like) receiver/sender devices could be used to keep track of all vehicle speeds and/or intended travel paths throughout an entire roadway system. This information could then be used to inform drivers as to optimum speeds, lane of travel, and travel plans/paths. This is illustrated in FIG. 11, which shows vehicles a grouped into pods and coordinated on a roadway having no stoplights. As depicted, holding area 1120 is located on the far right lane or shoulder of the roadway. Prior to entering the roadway 1110, users are able to input their destination, as well as the desired speed of travel, or accept the default speed of the roadway. Using a procedure similar to that illustrated in FIG. 10, vehicle A enters the roadway 1110 via entrance ramp 1115, and if no suitable pod is available, pauses in holding area 1120. Vehicles are allowed to continue and enter a lane on the roadway 1110 only when a suitable pod approaches. In this case, pod suitability is also based upon the predetermined speed of travel. In the embodiment shown in FIG. 11, pods are arranged on the roadway 1110 lanes by speed, with the fastest in the left most lane and the slowest in the right most lane. Alternate embodiments may also utilize pods which span a plurality of lanes or all lanes. Once a suitable pod approaches, vehicle A accelerates and changes lanes in order to join vehicles in pod B. As previously described in earlier embodiments, position within the pod is determined both by vehicle destination and driver skill rating.

Vehicle following distance as shown in FIG. 11 is closely maintained using automatic onboard speed/brake controlling systems, as previously described in earlier embodiments. Vehicles traveling in pods in this manner have the benefits of the safety and allowance for the inherent lag in vehicle speed and direction changes that is afforded by the buffer spacing between pods. An additional advantage is the high density of vehicles within the pods, contributing to high rates of vehicle throughput on the roadway. A final advantage is the ability of the pod to accelerate, decelerate, or change lanes simultaneously as a group, in order to optimize roadway usage and avoid accidents, obstacles, dangerous conditions, or slowdowns. For instance, accident information could also indicate which lanes are blocked or have non-moving vehicles a mile ahead and could inform drivers when to change lanes and the approach speed. Vehicles that are in close proximity to each other could also exchange data between them to coordinate lane changes with each other, prioritize queue placement, and speed of travel.

While the invention has been described in connection with various preferred embodiments, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A method of operating a traffic control system that controls movement of vehicles on one or more portions of a roadway, comprising:

communicating discrete instructions to a plurality of vehicles;

exchanging traffic control data with the plurality of vehicles, the traffic control data comprising at least one of current and desired speed and at least one of current and future position, wherein one or more of the plurality of vehicles is entering the roadway; and on contiguous portions of the roadway not having any intersections, instructing the one or more vehicles entering the roadway when to change speed so as to join a pod composed of some of the plurality of vehicles, wherein each pod is composed of vehicles traveling at the same speed and in the same lane, wherein the one or more vehicles desiring to enter the roadway are instructed to change speed to enter a pod in an order dependent upon at least one of the destination of each vehicle and the driving skill of each vehicle.

2. The method of claim 1 wherein the pods are instructed to change speed or perform lane changes in order to optimize one or more of roadway usage, avoiding accidents, avoiding obstacles, avoiding dangerous conditions, or avoiding slowdowns.

3. The method of claim 1 further comprising instructing a first vehicle traveling in a pod to maintain a distance behind a second vehicle traveling in front of the first vehicle.

4. The method of claim 1 further comprising:

prompting one or more vehicles to enter a first pod at a time determined by the speed and location of the first pod; and providing a preliminary notification to the one or more of the vehicles that they will be prompted to join the first pod.

5. The method of claim 4 wherein the prompting one or more vehicles to enter the first pod at a time determined by the speed and location of the first pod comprises:

providing a countdown to the one or more of the vehicles of a time to join the first pod and a target speed to achieve to join the first pod.

6. The method of claim 1 wherein communicating discrete instructions to a plurality of vehicles, comprises visually communicating discrete instructions to the plurality of vehicles.

7. A method of operating a traffic control system that controls movement of vehicles on one or more portions of a roadway, comprising:

communicating discrete instructions to a plurality of vehicles;

exchanging traffic control data with the plurality of vehicles, the traffic control data comprising at least one of current and desired speed and at least one of current and future position, wherein one or more of the plurality of vehicles is entering the roadway; and on contiguous portions of the roadway not having any intersections, instructing the one or more vehicles entering the roadway when to change speed so as to join a pod composed of some of the plurality of vehicles, wherein each pod is composed of vehicles traveling at the same speed and in the same lane, wherein a portion the vehicles are grouped into a first pod and a second pod, the method further comprising:

instructing the first pod to wait a buffered distance from an intersection on the roadway; and instructing the second pod to travel at a common speed so as to arrive at the intersection when a control signal is still green, instructing the first pod to increase speed so as to travel behind the second pod and traverse the intersection together as a group of vehicles instructed to travel at the same speed, in the same direction, and on the same road, each vehicle in a pod being separated from other vehicles in its associated pod by at least a first distance.

8. The method of claim 1 further comprising:

determining that a pod has a length that exceeds a distance between two intersections on the roadway; and coordinating timing of control signals at the two intersections to cause the control signal at a second of the two intersections to permit the pod to traverse the intersections as a group.

9. A method of operating a traffic control system that controls movement of vehicles on one or more portions of a roadway, comprising:

communicating discrete instructions to a plurality of vehicles;

exchanging traffic control data with the plurality of vehicles, the traffic control data comprising at least one of current and desired speed and at least one of current and future position, wherein one or more of the plurality of vehicles is entering the roadway;

on contiguous portions of the roadway not having any intersections, instructing the one or more vehicles entering the roadway when to change speed so as to join a pod composed of some of the plurality of vehicles, wherein each pod is composed of vehicles traveling at the same speed and in the same lane; and instructing the one or more vehicles entering a first pod to change speed so as to enter the first pod in reverse order according to each of the one or more vehicles' intended exit location.

10. The method of claim 7 wherein the pods are instructed to change speed or perform lane changes in order to optimize one or more of roadway usage, avoiding accidents, avoiding obstacles, avoiding dangerous conditions, or avoiding slowdowns.

11. The method of claim 9 wherein the pods are instructed to change speed or perform lane changes in order to optimize one or more of roadway usage, avoiding accidents, avoiding obstacles, avoiding dangerous conditions, or avoiding slowdowns.

12. The method of claim 7 further comprising instructing a first vehicle traveling in a pod to maintain a distance behind a second vehicle traveling in front of the first vehicle.

13. The method of claim 9 further comprising instructing a first vehicle traveling in a pod to maintain a distance behind a second vehicle traveling in front of the first vehicle.

* * * * *